United States Patent [19]

Kopf et al.

[11] 3,844,940
[45] Oct. 29, 1974

[54] SYSTEM FOR MEASURING ULTRAFILTRATION RATE

[75] Inventors: J. David Kopf, Tujunga; Raymond C. Van den Heuvel, Northridge, both of Calif.

[73] Assignee: David Kopf Systems, Tujunga, Calif.

[22] Filed: Apr. 26, 1973

[21] Appl. No.: 354,873

[52] U.S. Cl. .................. 210/22, 210/88, 210/96, 210/321, 73/64.3, 324/71
[51] Int. Cl. .............................................. B01d 13/00
[58] Field of Search ............... 210/88, 96, 321, 22; 73/64.3

[56] References Cited
UNITED STATES PATENTS

| | | | |
|---|---|---|---|
| 3,506,126 | 4/1970 | Serfass et al. | 210/96 |
| 3,508,656 | 4/1970 | Serfass et al. | 210/96 |
| 3,795,318 | 3/1974 | Crane et al. | 210/321 |

*Primary Examiner*—Roy Lake
*Assistant Examiner*—R. Daniel Crouse
*Attorney, Agent, or Firm*—Bruce H. Johnsonbaugh

[57] ABSTRACT

A system for measuring the rate of ultrafiltration through a semipermeable membrane of a first fluid flowing across one surface of said membrane at a first pressure into a conductive second fluid flowing across the other surface of the membrane at a second pressure wherein the flow of the second fluid across the membrane is stopped, the pressure differential across the membrane is maintained at a constant level, the amount of second fluid displaced by the ultrafiltrating first fluid is passed between two electrodes across which a constant voltage is maintained, and the rate of increasing current flow between the electrodes is used to determine ultrafiltration rate.

9 Claims, 4 Drawing Figures

FIG_1
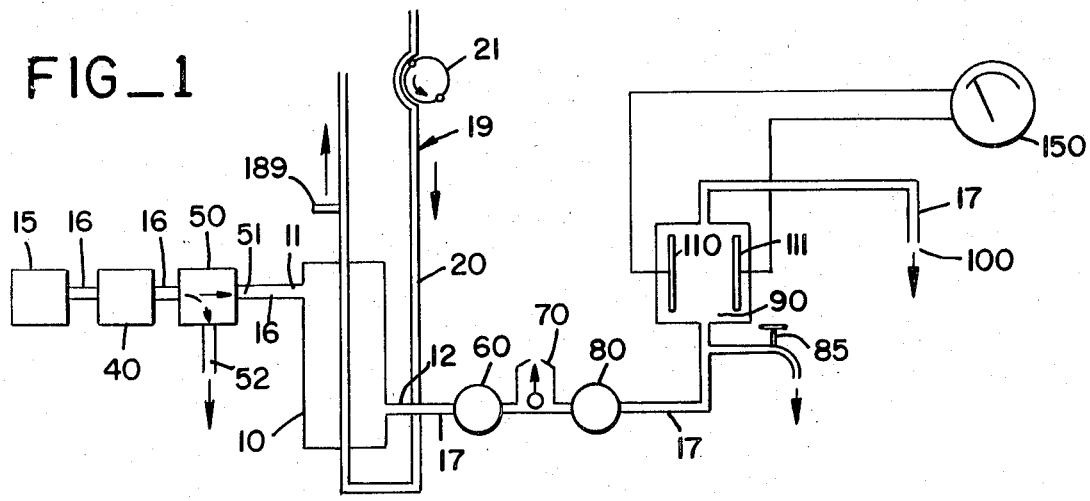
FIG_2
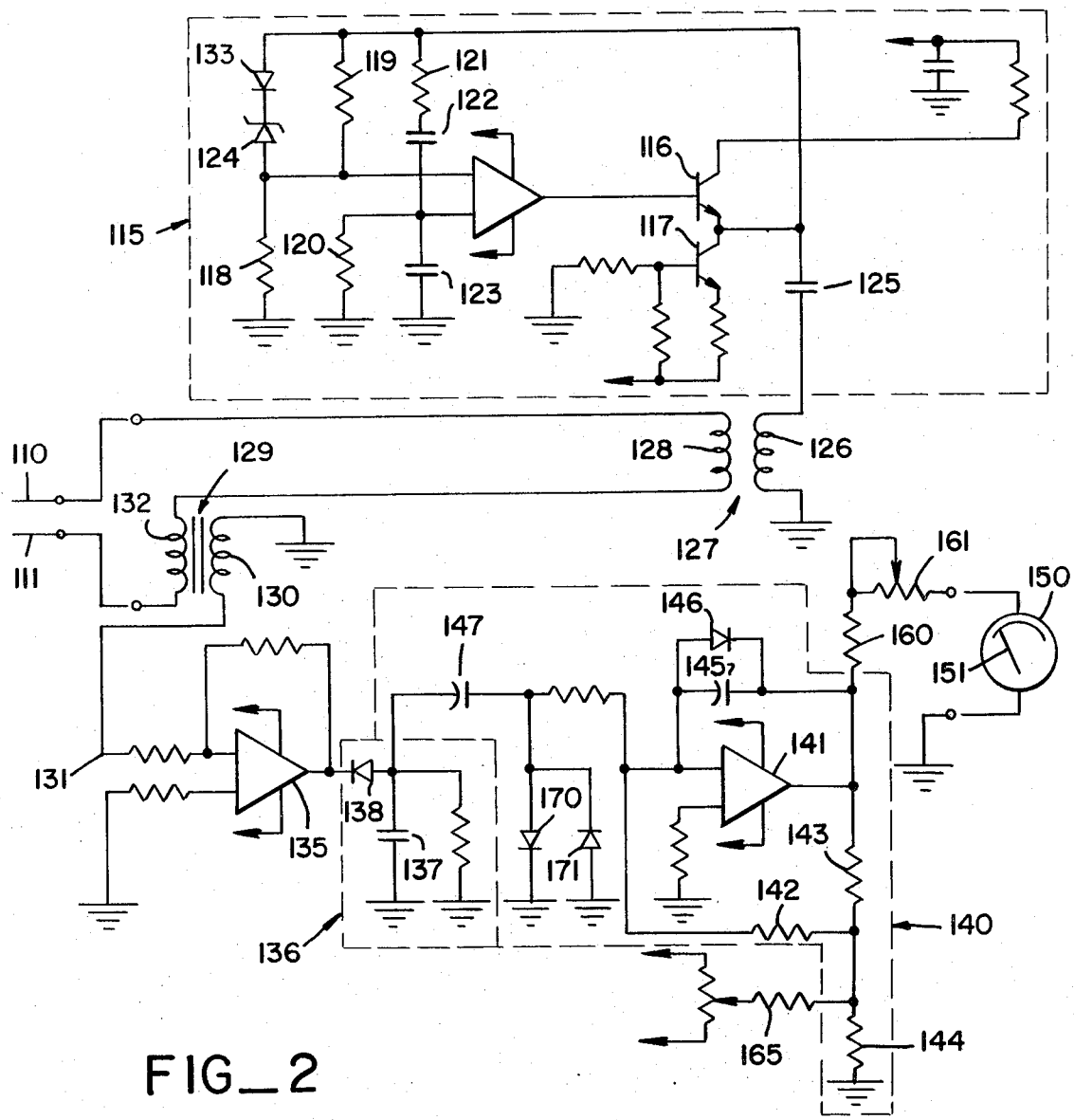

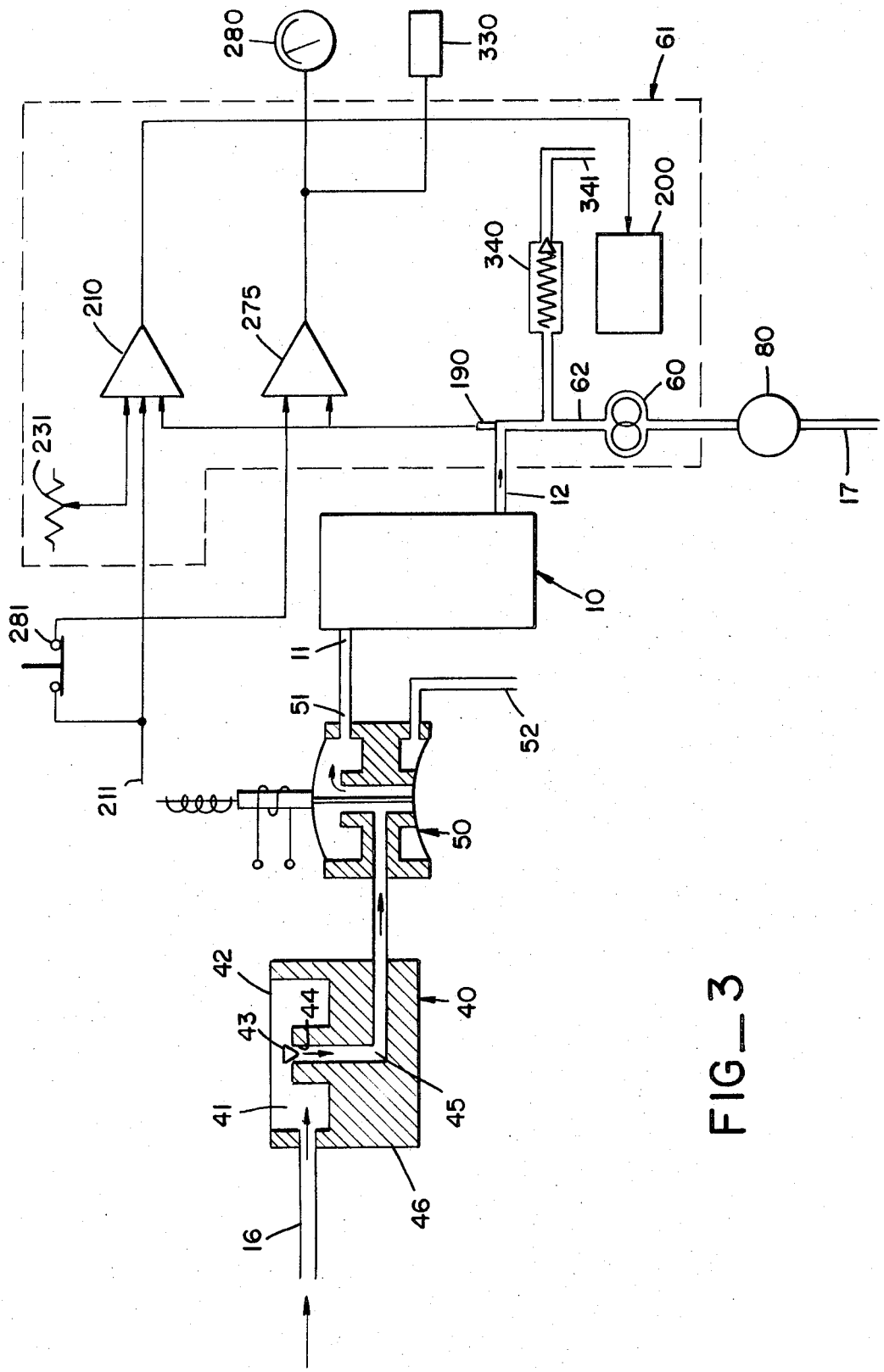
FIG—3

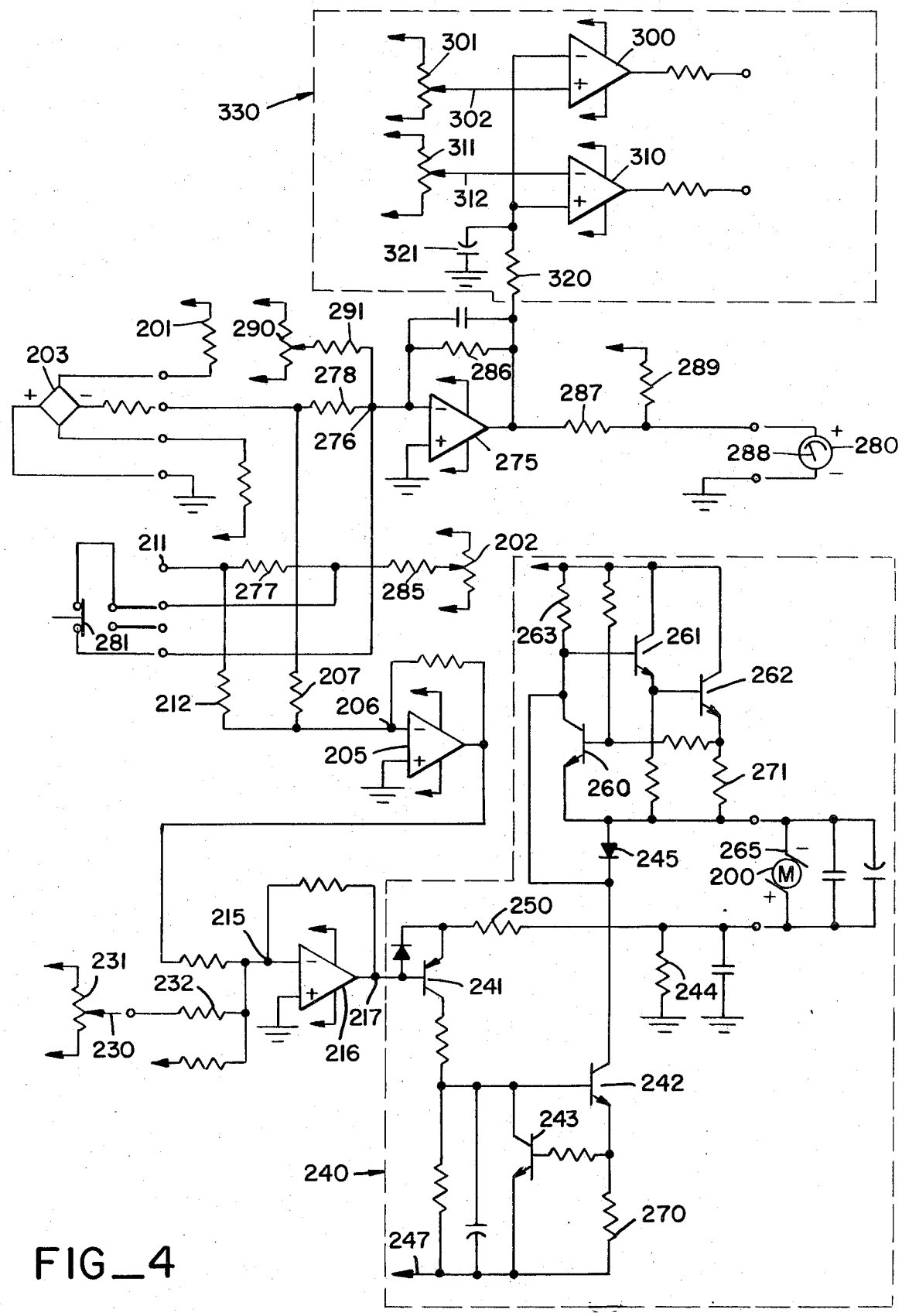
FIG_4

SYSTEM FOR MEASURING ULTRAFILTRATION RATE

This invention pertains generally to the measuring of the rate of ultrafiltration across a semipermeable membrane. The invention pertains more particularly to hemodialysis, in which the rate of ultrafiltration of water from the patient's blood across an artificial kidney membrane is extremely important. In hemodialysis, one object is to remove a given amount of water from the patient's blood over a given period of time. The rate at which water is removed from the blood is important to avoid, on the one hand, adverse reactions of the patient to an excessively rapid withdrawal of water and, on the other hand, adverse reactions of the patient from being connected to an artificial kidney machine for an unnecessarily long period of time if water is removed at too slow a rate.

Systems used in the prior art require a visual inspection of ultrafiltrating fluid filling a chamber of known volume over a given period of time. Such systems are shown in DHEW publication number (NIH) 72-248 at pages 12-16 (particularly FIG. 2 at page 15), dated Jan. 24-26, 1972 and in an article entitled "Parallel Flow Plastic Hemodialyser as a Membrane Oxygenator" by Fredrik Kiil and Jack F. Glover, Jr. published in Transactions of the American Society for Artificial Internal Organs (ASAIO), Vol. VIII (1962), at pages 43-46 (particularly FIG. 1A, page 46). The instant invention provides an automatic system for indicating the rate of ultrafiltration.

In an artificial kidney machine, blood from a patient with kidney failure flows at a positive pressure across one side of a semipermeable membrane while dialysate solution simultaneously flows across the opposite side of the semipermeable membrane at a negative pressure or at a lower positive pressure than that of the blood. Since the membrane is permeable to water and waste matter, but not blood cells, water ultrafiltrates from the blood through the membrane into the dialysate solution because of the pressure differential (transmembrane pressure) between the blood and dialysate solution. Waste matter passes from the blood through the membrane because of the lower concentration of these waste matters in the dialysate solution than in the blood. Removal of waste matter from the blood is referred to as "clearance." Removal of water from the blood is referred to as "ultrafiltration." The rate at which water ultrafiltrates depends upon the available membrane surface area, the permeability of the membrane and the transmembrane pressure. Rate of ultrafiltration of water is independent of the flow rate of dialysate solution across the membrane. Therefore, rate of ultrafiltration continues to be substantially the same while the flow of dialysate solution across one surface of the membrane is interrupted. After the flow of dialysate across the membrane is stopped, water from the blood continues ultrafiltrating through the membrane and combines with and displaces the non-flowing dialysate solution. The rate at which the volume of combined ultrafiltrate and non-flowing dialysate solution increases is the rate of ultrafiltration.

In accordance with this invention, the flow of dialysate solution across the membrane is stopped, transmembrane pressure is automatically held constant, and the rate at which the volume of ultrafiltrating water and non-flowing dialysate solution increases is measured. The combination of ultrafiltrate and dialysate enters an empty chamber which has a pair of spaced electrodes between which a voltage is maintained. As the chamber is filled, current flowing between the electrodes increases in proportion to the rate at which the chamber is filled and therefore in proportion to the rate of ultrafiltration. The rate at which this current flow increases between the electrodes is sensed electronically and is used to automatically indicate rate of ultrafiltration.

This invention also provides a system in which the transmembrane pressure may be adjusted over a wide range of values. This capability allows the system of this invention to accommodate differences between patients and differences between various types of artificial kidney membranes. As an example, some patients may require that substantial amounts of waste matter be cleared from their blood, but that very little or no water be removed from their blood during hemodialysis. This invention can accommodate such a patient. The transmembrane pressure is reduced by changing the pressure at which dialysate solution flows across the membrane to the same pressure as that of the blood flowing across the membrane if no water is to be removed, and to a slightly lower pressure than that of the blood if a small amount of water is to be removed. Similarly, this invention accommodates different types of artificial kidney membranes such as coil and hollow fiber membranes.

Another important feature of this invention is that the transmembrane pressure may be varied during operation without affecting dialysate flow rate or dialysate mix ratio. The transmembrane pressure is varied by adjusting the pressure of dialysate. In addition, dialysate flow rate and dialysate mix ratio may be independently adjusted. This feature facilitates stable operation of the system.

A primary object of this invention is to provide a system for measuring rate of ultrafiltration through a semipermeable membrane which is automatic and virtually free from human error.

A further object of this invention is to provide a system for measuring the rate of ultrafiltration through an artificial kidney membrane and for adjusting the rate of ultrafiltration to a desired level.

A further object of this invention is to provide a system for measuring the rate of ultrafiltration in an artificial kidney machine which is highly accurate and stable.

A further object of this invention is to provide a system for use in an artificial kidney machine in which each of the following three variables may be adjusted independently of the other two:

a. the pressure of dialysate solution flowing across the kidney membrane (and therefore transmembrane pressure), b. the flowrate of dialysate solution across the kidney membrane, and c. the mix ratio or concentration of the dialysate solution.

Further objects and advantages of the invention will become apparent from the following description of a preferred embodiment and the drawings wherein:

FIG. 1 is a schematic representation of the components of the invention;

FIG. 2 is a circuit diagram for a portion of the invention for measuring the rate of ultrafiltration;

FIG. 3 is another schematic representation of the invention; and

FIG. 4 is a circuit diagram of a portion of the invention for maintaining a constant pressure differential.

FIG. 1 is a schematic diagram of pertinent portions of an artificial kidney machine. The semipermeable kidney membrane 10 has a first fluid such as blood flowing across one surface thereof at a first pressure through a blood circulation or first supply means 19 comprising conduit 20 and roller pump 21. The second fluid flowing at a second pressure across the opposite side of the semipermeable membrane 10 is a dialysate solution which flows through a first conduit 16 from a dialysate delivery or second supply means 15 to membrane 10. Delivery system 15 may be the system described in U.S. Pat. application Ser. No. 268,308 filed July 3, 1972 for Proportioning System, or it may be a batch delivery system.

The dialysate solution flows through a back-pressure regulator 40 and into a dialysate shutoff means or three-way bypass valve 50 in conduit 16. Outlet 51 of shutoff means 50 leads to the inlet 11 of artificial kidney membrane 10. Outlet 52 of valve 50 leads to drain.

A second conduit 17 carries the dialysate from the membrane 10 to drain 100. Pump means 60 in conduit 17 downstream of kidney membrane 10 normally maintains a subatmospheric pressure (vacuum) at outlet 12 of kidney membrane 10. This subatmospheric pressure is the primary force causing the dialysate solution to flow across the kidney membrane 10. The dialysate solution then flows through a bubble separator 70, a blood leak detector 80, and through enclosed collection chamber 90 to drain 100. Drain 85 upstream of chamber 90 is used to empty enclosed collection chamber 90, but in normal operation, drain valve 85 is closed.

The operation of the invention is as follows. The flow of dialysate solution through input 11 of kidney 10 is stopped by actuating valve 50 and closing off outlet 51, thereby diverting dialysate solution to drain 52. At this time, drain valve 85 is opened, draining chamber 90, and when chamber 90 is fully drained, drain valve 85 is closed. Bypass 50 and drain valve 85 may be actuated either electronically or mechanically. Water from the patient's blood continues to ultrafiltrate through the kidney membrane at the same rate as when dialysate solution was flowing across membrane 10, due to the maintenance of a constant pressure differential across the membrane. This constant transmembrane pressure is maintained by means 61 of FIG. 3 for maintaining constant pressure differential. The ultrafiltrating water from the blood displaces and combines with the dialysate solution remaining in the kidney 10 and begins to fill chamber 90. Since the fluid entering chamber 90 is conductive, as chamber 90 fills, current passing between electrodes 110 and 111 will increase, and this increasing current is converted electronically into the actual rate of ultrafiltration and is displayed at meter 150.

FIG. 2 shows a circuit which is used to convert the increased current flow between electrodes 110 and 111 as fluid rises in chamber 90 to the rate of ultrafiltration which is displayed or indicated at meter 150. The circuit of FIG. 2 forms a measuring means connected to electrodes 110 and 111 for measuring the rate of change of electrical conductivity between said electrodes as chamber 90 is filled. Oscillator 115 provides a constant voltage output between 10 and 20 KHz. Transistors 116 and 117 make up the power stage of the operational amplifier. Transistor 116 is an emitter-follower, and the circuit of transistor 117 is a "pull-down," constant current source. Resistor 118 and 119 are part of a negative feedback loop that limits the gain of the operational amplifier to slightly more than 3. This is the condition for oscillation in the present circuits, where resistance 120 is equal to resistance 121, and capacitor 122 is equal to capacitor 123. Resistance 120, resistance 121, capacitor 122 and capacitor 123 are part of the positive feedback loop, and their respective values determine the frequency of oscillation. Zener diode 124 is part of the negative feedback loop and breaks down when the amplitude of the oscillations exceeds a predetermined level. When this occurs, the closed loop gain of the operational amplifier drops to a lower value and the amplitude of the oscillations is subdued. Diode 133 prevents zener diode 124 from conducting in the forward mode where it would act as a regular diode, rather than in the intended reverse breakdown mode. The output of oscillator 115 is capacitively coupled through capacitor 125 to the primary 126 of first transformer 127. The voltage at the secondary 128 of transformer 127 causes an alternating current to flow between electrodes 110 and 111 in a direction transverse to the dialysate flowstream and through the primary 132 of the second current transformer 129. A constant electric potential is maintained between electrodes 110 and 111. Since the reflected impedance from the primary 132 to the seconary 130 of transformer 129 is very small in comparison with the minimum resistance between electrodes 110 and 111, the current flow between electrodes 110 and 111 is, for all practical purposes, unaffected by transformer 129. Hence, transformer 129 functions as a current transformer. The current that flows through the secondary 130 of transformer 129 is proportional to how deeply electrodes 110 and 111 are immersed in conductive fluid, the current flowing through the secondary 130 is the current flowing between the electrodes 110 and 111, scaled down by an amount proportional to the turn ratio of the primary 132 and secondary 130 windings of transformer 129. Current in secondary 130 is injected into the summing node 131 of amplifier means 135 for amplifying the output of current transformer 129.

The voltage at the output of amplifier 195 is proportional to the current flowing between electrodes 110 and 111. A peak value detector means 136 converts the output of amplifier 135 into a corresponding DC voltage across capacitor 137. This rectified DC voltage represents the liquid level in chamber 90 and is roughly equal to the peak value at the output of amplifier 135 minus 0.7 volt. As a result, as long as the output of amplifier 135 remains below 0.7 volt, no voltage appears across capacitor 137.

Differentiator means 140 produces a voltage at the output of amplifier 141 proportional to the rate of increase of voltage across capacitor 137 and, therefore, proportional to the rate of increase of fluid level in chamber 90.

The feedback loop around amplifier 141 is essentially resistive (network of resistors 142, 143 and 144), but capacitor 145 in parallel with the feedback network acts as a damper. Diode 146 prevents the output of amplifier 141 from becoming negative. Capacitor 147, the integrating capacitor, is connected between the output of the peak value detector 136 and the inverting input of amplifier 141. Because of the negative feedback loop around amplifier 141, the inverting input is a virtual ground point. Thus, the current that flows through capacitor 147 is truly proportional to the change in the voltage across capacitor 137 which, in turn, is proportional to the rate of change of the liquid level in collection chamber 90.

The current through capacitor 147 is converted to an equivalent voltage at the output of amplifier 141.

Resistors 160 and variable resistance 161 determine the amount of current that flows through the meter 150 for a given output voltage of amplifier 141.

Resistance 165 is used to adjust meter 150 to read zero when no change occurs in the liquid level of chamber 90. Diodes 170 and 171 prevent the voltage at the inverting input of amplifier 141 from exceeding plus or minus 0.7 volt when large, sudden changes occur in the voltage across capacitor 137.

The voltage delay of peak value detector 137 caused by the forward drop in diode 138 is useful in desensitizing differentiator 140 for low liquid levels in chamber 90. Otherwise, a sudden change from zero conductivity to a small value when the dialysate first comes into contact with electrodes 110 and 111 would cause the pointer 151 of meter 150 to jump to the extreme right end of the scale. The voltage delay of the peak value detector 136 causes the change in liquid level in chamber 90 to be sensed by the differentiating circuit 140 only after this liquid level has reached a predetermined value.

FIG. 3 is a schematic representation showing means 61 for maintaining a constant pressure differential (transmembrane pressure) between the blood pressure, or first pressure, and the pressure of the dialysate flowing across kidney membrane 10 (second pressure). Transmembrane pressure is approximated by measuring venous blood pressure with transducer 189 (FIG. 1) located downstream of kidney membrane 10 in conduit 20 and considering this pressure as equivalent to blood pressure immediately adjacent membrane 10; pressure of dialysate flowing across membrane 10 is approximated by measuring dialysate pressure with transducer 190 (FIG. 3) at the input of pump means 60. For negative dialysate pressures, the transmembrane pressure is the sum of the absolute values of venous pressure and dialysate pressure. For positive dialysate pressures, the transmembrane pressure is the difference between venous blood pressure and dialysate pressure. Means 61 for maintaining this constant transmembrane pressure is important for two reasons. First, it facilitates the accurate measurement of the rate of ultrafiltration through kidney membrane 10 as described above. Second, it facilitates adjustment of dialysate pressure without affecting dialysate flowrate or mix ratio, as described below.

Back pressure regulator 40 serves to isolate means 61 for maintaining transmembrane pressure from the dialysate delivery system 15 which is upstream of regulator 40. In operation, regulator 40 shuts off the flow of dialysate when the pressure in input cavity 41 drops below a predetermined value of approximately 3 pounds per square inch. As a result, the upstream pressure in the dialysate delivery system 15 remains unaffected by dialysate flow rate or downstream pressure. As dialysate flow rate through regulator 40 decreases, pressure in input cavity 41 in housing 46 decreases, diaphragm 42 sags, and resiliently urges needle valve 43 to be depressed closer to seat 44 in outlet passageway 45, thereby reducing the flow of dialysate solution out of regulator 40. The diaphragm 42 continues to depress needle 43 (needle 43 may be connected to diaphragm 42 by a spring) towards seat 44 until the pressure of dialysate solution in input cavity 41 is restored. When the flow rate of dialysate solution into regulator 40 increases, diaphragm 42 bulges in an upward direction and the flow of dialysate is increased until the input pressure is restored to the predetermined value. Regulator 40 ceases to function when the downstream pressure is more positive than the pressure for which regulator 40 is set. Input cavity 41 receives dialysate from delivery system 15. Dialysate flows through outlet passageway 45 to membrane 10 through bypass valve 50.

The use of regulator 40 in conjunction with the remaining components of this system facilitates the independent adjustment of dialysate flow rate, dialysate mix ratio or concentration, and dialysate pressure. A change in dialysate flow rate does not cause a change in the mix ratio of concentrated dialysate solution and water, nor does it cause a change in the negative pressure maintained at the output of kidney 10; a change in negative pressure at the output 12 of kidney 10 does not influence either the dialysate flow rate or the mix ratio of concentrated dialysate solution and water to form dialysate; and a change in the mix ratio of dialysate does not affect either dialysate flow rate or dialysate pressure. Assuming blood pressure remains constant, which is usually the case, a change in dialysate pressure causes a change in transmembrane pressure.

Pump means 60 is capable of operating at positive pressures, i.e. above atmospheric pressure. The operating range of pump means 60 in the embodiment shown is from minus 450 mm. Hg to plus 250 mm. Hg. Pump means 60 is in this embodiment a positive displacement gear pump. When used in combination with high ultrafiltration rate hollow-fiber kidney membranes, it is frequently necessary for the dialysate pressure at output 12 to be above atmospheric pressure. Dialysate pressure can be increased to a point where it equals blood pressure, which is necessary for a patient who needs waste matter cleared from his blood but needs no water removed from his blood.

The pressure at the input of pump means 60 is controlled by the torque of DC motor 200 which drives pump means 60 and, hence, by the current flowing through the rotor windings of motor 200.

The pressure to be generated at the input of pump means 60 is controlled by a closed loop servo-mechanism which, as shown in FIG. 3, includes pressure transducer 190, amplifier 210, transmembrane pressure adjustment 231, and motor 200. To prevent excessive negative pressure at the input of pump means 60, a pressure relief valve 340 is provided which allows air to enter inlet 341 when a certain negative pressure is reached, thus reducing the vacuum at inlet 62.

In operation, the circuit of amplifier 210 computes the difference between venous blood pressure and dialysate pressure to arrive at transmembrane pressure, and compares this actual transmembrane pressure to the desired transmembrane pressure established by pressure adjustment 231, amplifies the difference between the actual and desired transmembrane pressures (error signal), and drives DC motor 200 with a current proportional to the amplified error signal and with polarity such that the error signal tends to be cancelled.

The fast response of the control loop is due to the use of miniature, low inertia semi-conductor strain gauge pressure transducers 189 and 190, minimum delay electronic circuits and inertia-free pressure control of the pump 60 because the torque of the pump is varied rather than its speed.

In the embodiment shown, venous blood pressure is used as an approximation of blood pressure immediately adjacent the kidney membrane. It is within the scope of this invention that blood pressure be measured by averaging blood pressures before and after flowing over the kidney membrane. Dialysate pressure is sensed at the input of pump means 60, and this is used to approximate the pressure of dialysate solution immediately adjacent the kidney membrane. It is within the scope of this invention to derive dialysate pressure by averaging dialysate pressures at the input 11 and output 12 of kidney membrane 10.

FIG. 4 illustrates the electronic portion of means 61 for maintaining a constant transmembrane pressure. FIG. 4 includes the amplifier shown schematically in FIG. 3 and DC motor 200. Amplifier 210 of FIG. 3 includes the circuit of amplifiers 205 and 216 and control means 240 of FIG. 4 described below. Resistor 201 provides a current source for the bridge 203 of pressure transducer 190. Operational amplifier 205 is connected in a summing configuration and is a first summing amplifier. First pressure transducer 189 provides a first output current flowing into summing node 206 through input 211. Second pressure transducer 190 provides a second output current flowing into node 206 proportional to negative dialysate pressure at the output 12 of kidney membrane 10. The negative output of bridge 203 (dialysate pressure) is connected to node 206, the summing bus of amplifier 205 through resistance 207. Current flows away from node 206 toward resistor 207 for positive dialysate solution pressures.

Venous blood pressure is introduced at point 211 and is connected to node 206 through resistance 212. The net current flow into node 206 is the difference between venous and dialysate pressure, provided that the same amount of current is applied for the same pressure differential.

Because the input polarities are chosen as described above, an increase of venous blood pressure in a positive direction and/or an increase of dialysate pressure in a neagtive direction results in current flow into node 206. This current is translated into a proportional negative voltage at the output of first summing amplifier 205. The output of amplifier 205 is connected to node 215 which is the summing bus of second summing amplifier 216. The current injected in node 216 is the negative equivalent of the actual transmembrane pressure.

The desired value of transmembrane pressure is represented by the voltage present at wiper arm 230 of pressure adjustment potentiometer 231. The voltage at wiper arm 230 is connected to node 215 through resistor 232 and is proportional to the desired value of transmembrane pressure.

The net current injected into node 215 is, therefore, proportional to the difference between the actual transmembrane pressures. This error signal is amplified by amplifier 216 and appears at point 217. The error signal appearing at point 217 is fed into control means 240 which regulates the current flowing through motor 200 to vary the output torque of motor 200 in a manner to adjust the dialysate pressure to cancel the error signal at point 217 and to thereby maintain the desired transmembrane pressure differential.

The output of amplifier 216 is amplified successively by the circuits of transistors 241 and 242. A negative voltage at point 217 causes transistors 241 and 243 to conduct and current to flow from ground through resistance 244, the armature of motor 200, diode 245 and transistor 242, back to the minus terminal 247 of an unregulated power supply. The voltage drop across resistance 244 is proportional to the current flowing through the armature of motor 200. The emitter of transistor 241 is connected to resistance 244 through resistor 250 and the current from the collector of transistor 241 ceases to increase when the voltage present at the junction of resistor 244 and the positive input to the motor 200 approaches that present at the base of transistor 241. Since the collector current of the transistor 242 is proportional to that from the collector of transistor 241, current through resistor 244 and motor 200 also ceases to increase. The stabilizing action of the negative feedback connection through resistance 250 thus causes the current through motor 200 to be proportional to the negative voltage present at the output point 217 of amplifier 216, which, in turn, is proportional to the transmembrane pressure error. Since the error signal is amplified directly in terms of motor torque, and hence pressure of the dialysate solution at the input of pump means 60, the inertia parameter of the motor does not intervene in the stability of the negative feedback loop which is therefore capable of fast response.

The circuit of transistor 260, 261 and 262 constitutes an optional "pullup" stage. Its usefulness is in making it possible to reverse the current through motor 200 when it is desirable to develop a positive dialysate pressure adjacent to kidney membrane 10. Resistance 263 is the load resistor of transistor 242, and the darlington pair transistor 261-transistor 262 is the output emitter-follower of a "totem-pole" class B output stage. Transistors 261 and 262 conduct when the collector of transistor 242 is positive and current is to flow toward the negative terminal of motor 200. When transistor 242 conducts heavily and current flows away from the negative terminal 265 of motor 200, the current flow through diode 245 causes a negative bias to be applied to the base of transistor 261 and the "pullup" stage is cut off.

Transistors 243 and 260 are current limiters. When a current of sufficient magnitude flows out of the emitters of transistors 242 and 262, transistor 243 and transistor 260 conduct and short-circuit the bases of transistor 242 and transistor 261. The value of the limiting current is determined by the resistance values of resistors 270 and 271 respectively. The latter resistance values are calculated to cause a drop of 0.7 volt when the maximum allowable current flows through them.

Summing amplifier 275 is associated with pressure gauge 280. The net current reaching the summing bus 276 through resistor 277 and resistance 278 is proportional to transmembrane pressure. When pushbutton 281 is depressed, the connection to the venous pressure input 211 is broken, and only the dialysate pressure transducer 203 is connected. The circuit of resistors 285 and 202 causes a fixed current to be injected into the summing node 276 such that its magnitude is equal to and its polarity opposite to that of the current that flows through resistance 277 when venous blood pressure is zero. As a result, zero venous blood pressure results in no net current injected into node 276.

The resistance values of resistors 277, 278, 286 and 287 determine the amount of deflection of pointer 288 for a given pressure differential. Resistance 289 is used to pre-position pointer 288 to the right, where the scale zero is, by adding a fixed current flow through the meter 280. The polarity of the circuits is such that increasing transmembrane pressures causes the meter pointer 288 to deflect to the left. The circuit of resistors 290 and 291 contributes a fixed, but adjustable, bias current to node 276 that makes it possible to zero the pointer 288, i.e., adjust the final position of the pointer 288 which corresponds to zero pressure.

Meter 280 is used to read transmembrane pressure, and when push button 281 is operated, to measure dialysate pressure at the input of pump means 60. Alarm means 330 comprise comparators 300 and 310 connected respectively to potentiometers 301 and 311, whose wiper arms 302 and 312 represent the low and high pressure limits respectively. When the output of amplifier 275 is more negative than the voltage at wiper arm 302, the output of comparator 300 is positive. When the output of amplifier 275 is more positive than the voltage at the wiper arm 312, the output of comparator 310 is positive. A positive output from either comparator 300 or 310 is indicative of an off-limit condition.

Resistor 320 and capacitor 321 constitute an RC low-pass filter, the net effect of which is to delay the onset of an alarm indication in inverse proportion with the amount of deviation beyond the set limits. Large deviations lead to prompt alarm, small deviations to delayed alarm.

We claim:

1. A method of measuring the rate of ultrafiltration through a semipermeable membrane wherein a first fluid flows across one surface of said membrane at a first pressure and a conductive second fluid flows across the other surface of said membrane at a second pressure, a portion of said first fluid ultrafiltrating through the membrane into said second fluid, comprising the steps:
    stopping the flow of said second fluid across said semipermeable membrane,
    maintaining the pressure differential between said first and second pressures across said semipermeable membrane so that said first fluid continues to ultrafiltrate into said second fluid,
    passing a flowstream of the ultrafiltrating first fluid and said conductive second fluid into an electric field of constant potential and oriented in a direction transverse to the path of said flowstream, and
    sensing the increased electrical flow through said flowstream in said electric field as a function of time.

2. Apparatus for measuring the rate of ultrafiltration through a semipermeable membrane wherein a first fluid continously flows across one surface of said membrane at a first pressure and a conductive second fluid continuously flows across the other surface of said membrane at a second pressure, a portion of said first fluid ultrafiltrating through said membrane into said second fluid, comprising:
    first supply means for providing a flow of said first fluid across said membrane at said first pressure,
    second supply means for providing a flow of said conductive second fluid across said membrane at said second pressure,
    shutoff means for stopping the flow of said conductive second fluid across said membrane,
    means for maintaining a constant pressure differential between said first and second fluids,
    a collection chamber through which said ultrafiltrating first fluid and said conductive second fluid flow
    said collection chamber having a pair of electrodes between which a constant electric potential is maintained and between which there is increased current flow as said chamber receives said ultrafiltrating first fluid and said conductive second fluid
    drain means for emptying said collection chamber and
    measuring means for sensing increased current flow between said electrodes as a function of time.

3. Apparatus for measuring rate of ultrafiltration in an artificial kidney machine having an artificial kidney membrane which has a delivery system for providing a supply of dialysate solution, comprising:
    blood circulation means for flowing blood across said artificial kidney membrane at a first pressure
    an artificial kidney membrane across which said dialysate solution flows from said delivery system at a second pressure,
    a first conduit for carrying dialysate solution from said delivery system to said artificial kidney membrane
    dialysate shutoff means upstream of said artificial kidney membrane in said first conduit for stopping the flow of dialysate across said artificial kidney membrane
    a second conduit which carries said dialysate solution to drain after it flows across said artificial kidney membrane
    means maintaining a constant pressure differential between said first pressure of blood and said second pressure of dialysate flowing across said artificial kidney membrane
    an enclosed membrane in said second conduit downstream of said artificial kidney membrane
    drain means in said second conduit upstream of said chamber for draining said chamber
    a pair of electrodes in said chamber and
    measuring means connected to said electrodes for measuring the rate of change of electrical conductivity between said electrodes caused as said dialysate solution fills said chamber.

4. The device of claim 3 in which said measuring means comprises:
    an oscillator for providing a constant AC voltage through a first transformer to said electrodes in said chamber and through a second current transformer amplifier means for amplifying the output of said second current transformer, peak value detector means for converting the output of said amplifier means to a direct current voltage representing the amount of fluid in said chamber, and differentiator means which receives the output of said peak value detector means and converts said output to a voltage proportional to the rate of increase of fluid in said chamber.

5. The device of claim 4 further comprising:

indicator means for displaying the output of said differentiator means.

6. The apparatus of claim 3 wherein said means for maintaining a constant pressure differential comprises:

a first summing amplifier a first pressure transducer which provides a first output current flowing into the bus of said first summing amplifier proportional to positive venous blood pressure a second pressure transducer which provides a second output current flowing into the bus of said first summing amplifier proportional to negative dialysate pressure at the output of said kidney membrane said first summing amplifier converting said first and second outputs to a first summer output negative voltage proportional to the actual transmembrane pressure differential a second summing amplifier for receiving said first summer output means for providing current to the bus of said second summing amplifier proportional to a desired transmembrane pressure differential said second summing amplifier producing at its output an error signal proportional to the difference between actual transmembrane pressure differential and desired transmembrane pressure differential pump means downstream of said kidney membrane for pumping dialysate solution a motor for driving said pump means and control means for regulating the current flow through said motor in response to said error signal such that the torque of said motor is varied in a manner to adjust the dialysate pressure to cancel said error signal and to maintain the desired transmembrane pressure differential.

7. In an artificial kidney machine having a dialysate delivery system located upstream from an artificial kidney membrane, a system in which the variables of the pressure of dialysate flowing across the kidney membrane, the dialysate flowrate across the membrane and the dialysate mix ratio may each be varied independently of the other two comprising:

a backpressure regulator downstream of said dialysate delivery system but upstream of said kidney membrane, and means located downstream of said kidney membrane for maintaining a constant transmembrane pressure differential.

8. The system of claim 7 in which said backpressure regulator comprises:

a housing having an input cavity for receiving dialysate from said delivery system and an output passageway connected to said input cavity through which dialysate flows to said kidney membrane a needle valve which seats in said outlet passageway and a diaphragm which encloses said input cavity and which resiliently urges said needle valve into said output passageway in response to a lowering of dialysate pressure in said input cavity.

9. The system of claim 7 wherein said means for maintaining a constant transmembrane pressure differential comprises:

a first summing amplifier a first pressure transducer which provides a first output current flowing into the bus of said first summing amplifier proportional to positive venous blood pressure a second pressure transducer which provides a second output current flowing into the bus of said first summing amplifier proportional to negative dialysate pressure at the output of said kidney membrane said first summing amplifier converting said first and second outputs to a first summer output negative voltage proportional to the actual transmembrane pressure differential a second summing amplifier for receiving said first summer output means for providing current to the bus of said second summing amplifier proportional to a desired transmembrane pressure differential said second summing amplifier producing at its output an error signal proportional to the difference between actual transmembrane pressure differential and desired transmembrane pressure differential pump means downstream of said kidney membrane for pumping dialysate solution a motor for driving said pump means and control means for regulating the current flow through said motor in response to said error signal such that the torque of said motor is varied in a manner to adjust the dialysate pressure to cancel said error signal and to maintain the desired transmembrane pressure differential.

* * * * *